(12) United States Patent
Zhang et al.

(10) Patent No.: US 8,958,649 B2
(45) Date of Patent: Feb. 17, 2015

(54) VIDEO GENERATION WITH TEMPORALLY-OFFSET SAMPLING

(71) Applicant: Wisconsin Alumni Research Foundation, Madison, WI (US)

(72) Inventors: Li Zhang, Middleton, WI (US); Travis Portz, Seattle, WA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 117 days.

(21) Appl. No.: 13/799,436

(22) Filed: Mar. 13, 2013

(65) Prior Publication Data

US 2014/0270543 A1  Sep. 18, 2014

(51) Int. Cl.
*G06K 9/62* (2006.01)
*G06K 9/36* (2006.01)

(52) U.S. Cl.
CPC ...................................... *G06K 9/36* (2013.01)
USPC .......................................................... 382/209

(58) Field of Classification Search
USPC .............. 348/E11.002; 375/E7.205; 382/209; 386/335
See application file for complete search history.

(56) References Cited

U.S. PATENT DOCUMENTS

2014/0027613 A1* 1/2014 Smith ......................... 250/208.1

OTHER PUBLICATIONS

D. Reddy, A. Verraraghavan, and R. Chellappa. P2C2: Programmable Pixel Compressive Camera for High Speed Imaging. In CVPR, 2011.*
T. Poonnen, L. Liu, K. Karia, M. Joyner, and J. Zarnowski. A CMOS video sensor for High Dynamic Range (HDR) imaging. In Asilomar SSC, 2008.*
O. Shahar, A. Faktor, and M. Irani. Space-time superresolution from a single video. In CVPR, 2011.*
J. Gu, Y. Hitomi, T. Mitsunaga, and S. Nayar. Coded rolling shutter photography: Flexible space-time sampling. In ICCP, 2010.*
A. Agrawal, M. Gupta, A. Veeraraghavan and S. Narasimhan. Optimal coded sampling for temporal super-resolution. In CVPR, 2010.*
S. Boyd, N. Parikh, E. Chu, B. Peleato, and J. Eckstein. Distributed Optimization and Statistical Learning via the Alternating Direction Method of Multipliers. Foundations and Trends in Machine Learning, 3(1):1-122, 2011.
M. Gupta, A. Agrawal, A. Veeraraghavan, and S. Narasimhan. Flexible Voxels for Motion-Aware Videography. In ECCV, 2010.
Y. Hitomi, J. Gu, M. Gupta, T. Mitsunaga, and S. Nayar. Video from a Single Coded Exposure Photograph using a Learned Over-Complete Dictionary. In ICCV, 2011.
J. Holloway, A. Sankaranarayanan, A. Verraraghavan, and S. Tambe. Flutter Shutter Video Camera for Compressive Sensing of Videos. In ICCP, 2012.
S. Narasimhan and S. Nayar. Enhancing Resolution Along Multiple Imaging Dimensions Using Assorted Pixels. TPAMI, 27(4):518-530, 2005.

(Continued)

*Primary Examiner* — Gregory F Cunningham
(74) *Attorney, Agent, or Firm* — Crawford Maunu PLLC

(57) ABSTRACT

Various embodiments are directed to generating video data using temporally offset image data samples having disparate exposure times. Synthetic samples are generated for each of the pixels at a particular time period by computing, for each synthetic sample, a combined intensity of the captured samples that fall within the time period. Synthetic samples from adjacent pixels are grouped and image data in different groups is compared to identify matching groups. Video frames are constructed by combining image data from the captured samples based upon the matched images.

20 Claims, 6 Drawing Sheets

(56) References Cited

OTHER PUBLICATIONS

V. Ramachandra, M. Zwicker, and T. Nguyen. HDR Imaging From Differently Exposed Multiview Videos. In 3DTV, 2008.

A. Sankaranarayanan, C. Studer, and R. Baraniuk. CSMUVI: Video Compressive Sensing for Spatial-Multiplexing Cameras. In ICCP, 2012.

M. Tocci, C. Kiser, N. Tocci, and P. Sen. A Versatile HDR Video Production System. In SIGGRAPH, 2011.

C. Zach, T. Pock, and H. Bischof. A Duality Based Approach for Realtime TV-L1 Optical Flow. In DAGM, 2007.

J. Park and M. Wakin. A multiscale framework for Compressive Sensing of video. In PCS, 2009.

Broadcast Engineering. University Researchers make real-time HDR encoding reality, 1 pg. (2012). http:broadcastengineering.com/streaming/university-researchers-make-real-time-hdr-encoding-reality.

PointGrey. Imaging Products—Grasshopper CCD FireWire Cameras. Product Sheet, 1 pg. (download Aug. 16, 2013). www.ptgrey.com/products/grasshopper/grasshopper_firewire_camera.as.

\* cited by examiner

VIDEO GENERATION WITH TEMPORALLY-OFFSET SAMPLING

FEDERALLY SPONSORED RESEARCH OR DEVELOPMENT

This invention was made with government support under 0937847 and 0916441 awarded by the National Science Foundation. The government has certain rights in the invention.

FIELD

Aspects of the present disclosure relate generally to video generation, and more specifically, to generating video using temporally-offset sampling.

BACKGROUND

Videography has grown in popularity and implementation, and the demand for high-quality video has continued to increase. For example, automobiles use cameras for extra safety features, manufacturers use vision systems for quality control and automation, surgeons use small cameras for minimally invasive procedures, and mobile phones often have one or more cameras capable of video capture.

High dynamic range (HDR) video delivers imagery in a wide range of light intensities found in real scenes, ranging from sunlight to dark shadows. This gives HDR video more of a true brightness which can significantly enhance viewers' experience. However, HDR video can require significant post-processing, and combining frames can be computationally intensive. Further, when a scene has significant motion, capturing the scene may require a short exposure time that has motion aliasing and captures less light (resulting in a poor signal-to-noise ratio), and processing may require de-blurring efforts that can be difficult and prone to artifacts.

High-speed cameras have been useful for capturing high quality video, as they can be used to record fast-moving objects as an image onto a storage medium (e.g., using a charge-coupled device (CCD) or CMOS active pixel sensor), with a high number (e.g., greater than 1000) of frames per second. These are typically transferred onto DRAM for storage. However, high-speed cameras can be very expensive and complex. For example, it can be difficult to implement high-speed cameras in portable devices such as mobile telephones. While traditional video cameras can be relatively less expensive and easier to implement, such cameras often use a constant full-frame exposure time for each pixel and do not provide enough frames per second to create quality high-speed video. These and other problems have been challenging to the implementation of high-quality video capture.

SUMMARY

Various aspects of the present disclosure are directed to video capture and video processing apparatuses and methods.

In accordance with various embodiments, video is generated as follows. For each of a plurality of pixels representing an imaged scene, temporally-consecutive samples of image data are captured, with each captured sample having an exposure time that is different than the exposure time of other captured samples for that pixel. The captured samples for each of the pixels are temporally offset relative to the captured samples for at least another one of the pixels. For each of a plurality of time periods, a synthetic sample is generated for each of the pixels by computing, for each synthetic sample, a combined intensity of the captured samples that fall within the time period for that pixel. Synthetic samples from adjacent ones of the pixels are grouped for each of a plurality of different time periods. Image data in a first one of the groups of synthetic samples is matched with image data in a second group of samples, such as a second one of the groups of synthetic samples, by comparing the groups of synthetic samples obtained for different ones of the time periods. Video frames are constructed by combining image data from the respective captured samples based upon the matched image data from the first and second groups of synthetic samples.

Another example embodiment is directed to an apparatus having respective circuit modules as follows. A first circuit module provides, for each of a plurality of pixels representing an imaged scene, captured temporally-consecutive samples of image data in which each captured sample has an exposure time that is different than the exposure time of other captured samples for the pixel. Each captured sample for a pixel is temporally offset relative to the captured samples for at least another one of the pixels. A second circuit module generates, for each of a plurality of time periods, a synthetic sample for each of the pixels by computing, for each synthetic sample, a combined intensity of the captured samples that fall within the time period for that pixel. A third circuit module groups, for each of a plurality of different time periods, synthetic samples from adjacent ones of the pixels. A fourth circuit module matches, for each of the plurality of pixels, image data in a first one of the groups of synthetic samples with image data in a second one of the groups of synthetic samples, by comparing the groups of synthetic samples obtained for different ones of the plurality of different time periods. A fifth circuit module constructs video frames by combining image data from the respective captured samples based upon the matched image data from the first and second groups of synthetic samples. One or more of the circuit modules may be implemented together in a common circuit (e.g., a circuit executing instructions to process video image data accordingly).

The above summary is not intended to describe each embodiment or every implementation of the present disclosure. The figures and detailed description that follow more particularly exemplify various embodiments.

DESCRIPTION OF THE FIGURES

Aspects of the disclosure may be more completely understood in consideration of the following detailed description of various embodiments in connection with the accompanying drawings, in which.

Figure 1:
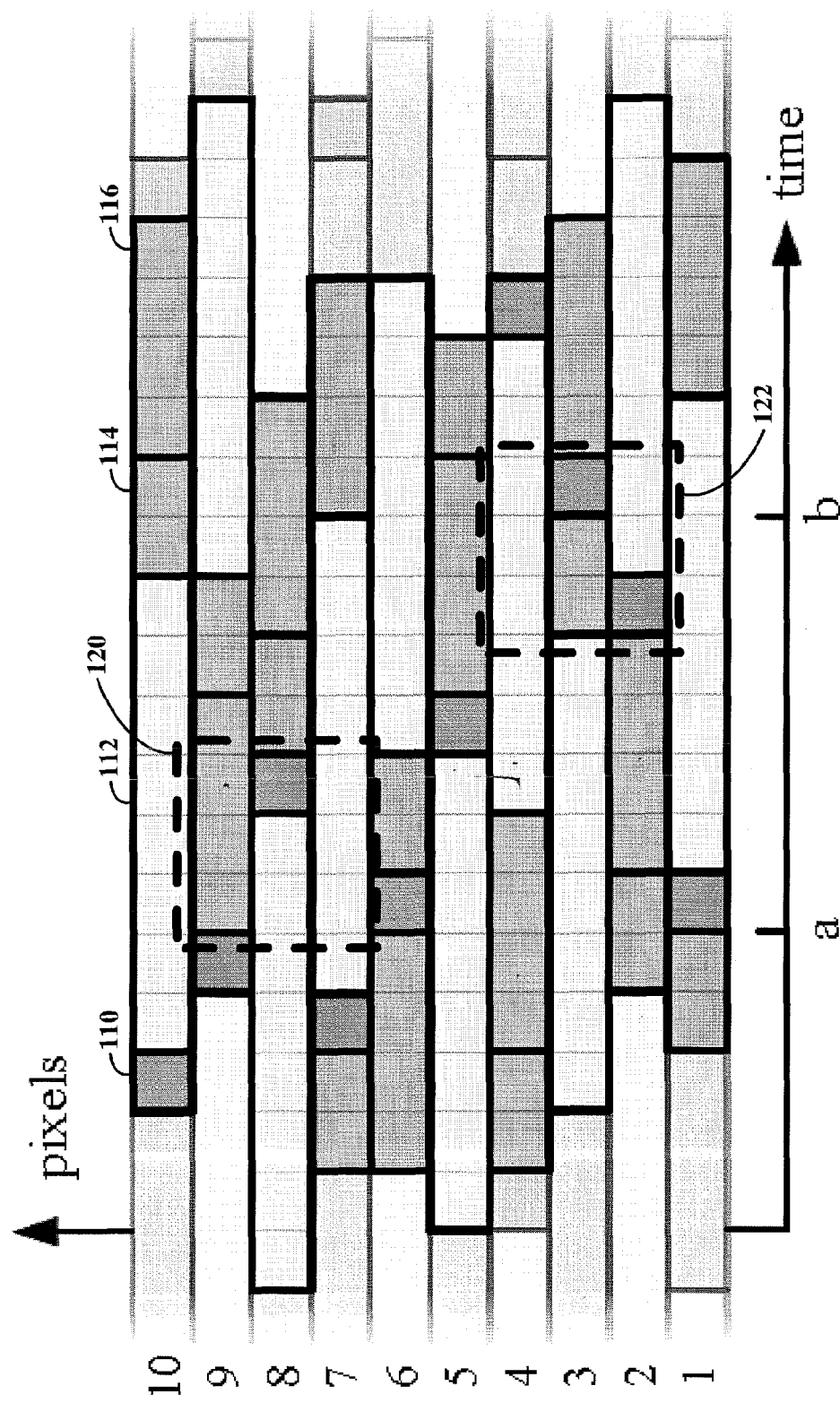
FIG. 1 shows a temporally-offset video sampling approach, in accordance with an example embodiment.

While various embodiments of the disclosure are amenable to modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

DETAILED DESCRIPTION

Various aspects of the present disclosure are directed to video capture and processing. While the present disclosure is not necessarily limited as such, various aspects may be appreciated through a discussion of examples using this context.

In connection with various example embodiments, high definition video is generated using an offset image capture approach and related processing. For each pixel in a camera, image data is captured at different times and having differing exposure periods (e.g., randomly selected), with the image data being temporally offset relative to image data captured for other ones of the pixels. Image data captured by different pixels and at different times are compared, and captured image data that is matched after comparison is used to construct a video having desirable definition.

Figure 2:
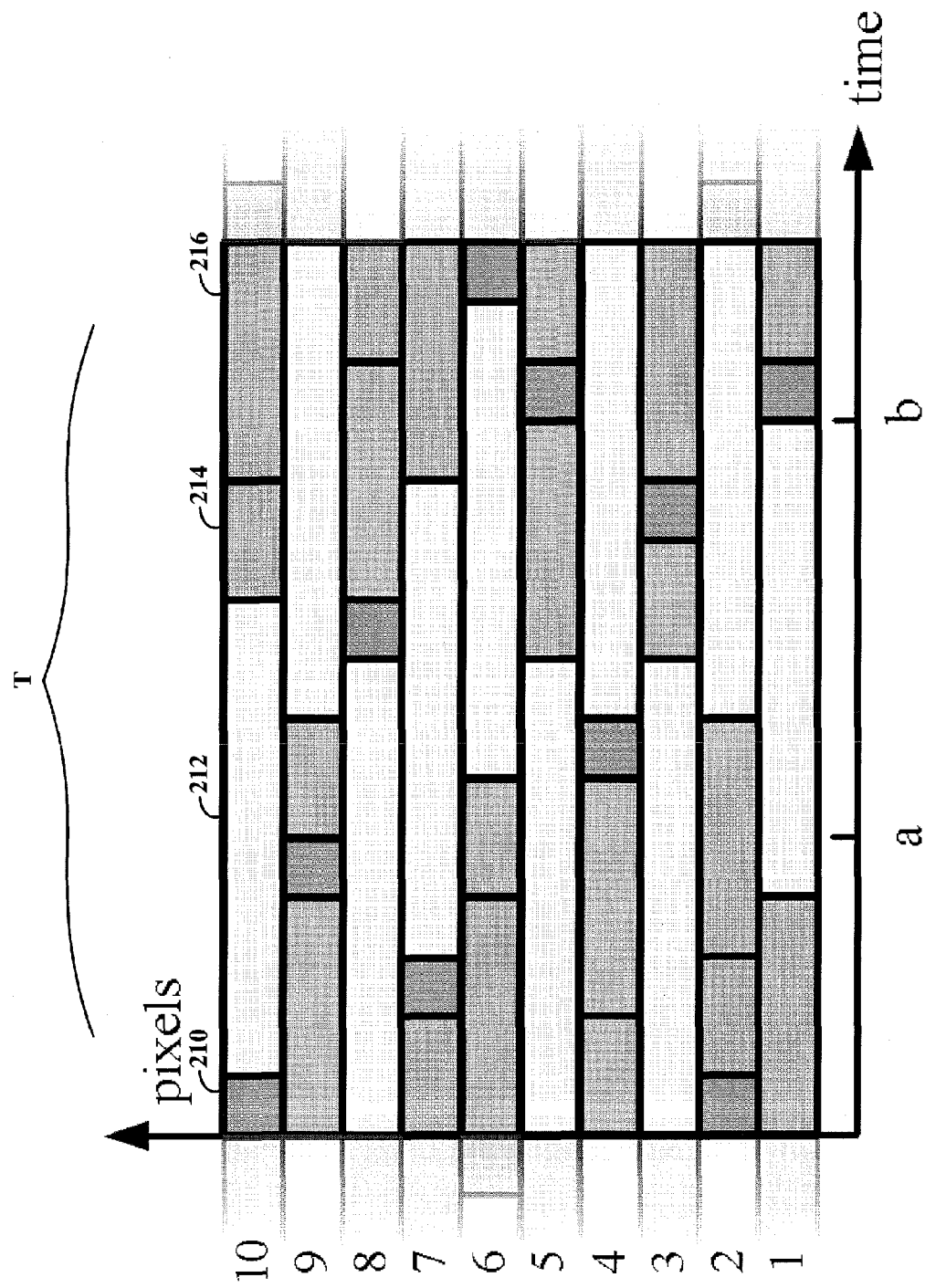
FIG. 2 shows another temporally-offset video sampling approach, in accordance with another example embodiment.

In some embodiments, such approaches are implemented for high-speed HDR video captured using a single low-speed camera. Images can be sampled at a relatively low rate, with offset (e.g., random) per-pixel exposure times and temporal offsets between respective pixels. Such approaches may be implemented using exposures and offsets as illustrated in FIGS. 1 and 2, which are discussed further below. The different exposure times used in the sampling scheme are used to achieve a high dynamic range, such as by using temporal and spatial redundancy in the video to match images captured by different pixels and construct high-speed video. In some implementations, a sensor such as a CMOS or CCD-based sensor is used to generate high-speed video frames, and can be implemented on a single chip. In certain implementations, these approaches are implemented by using nearly all light reaching an image sensor that collects the image data (e.g., with a very small amount of time between respective images captured at different exposures for each pixel, such as less than 10% of the total exposure time), facilitating low-light performance.

In some implementations, images are matched and combined using convex optimization based on block-matching and blurring of respective images. Optical flow tracking is used on the blurred images for following/tracking movement of objects, followed by further block matching and convex optimization to generate a resultant video image. For example, different sets of combined image data can be compared and used for determining an optical flow of images in the scene, with data combined based upon the determined optical flow. The images can be de-blurred along the time axis, and integrated over the known exposure times. In some implementations, a one-sided penalty function is used to handle saturation.

Various embodiments are directed to the acquisition of video data using one or more such approaches, and other embodiments are directed to the construction of video with data acquired using these approaches. Still other embodiments are directed to both the acquisition of image data and construction of video. Certain embodiments are directed to methods for one or more of these aspects, other embodiments are directed to apparatuses or systems that implement one or more of these aspects. Still other embodiments are directed to a computer program product recorded on a non-transitory medium and that, when executed by a processor and/or apparatus, causes one or more of the acquisition and construction aspects to be carried out. Such embodiments may, for example, be implemented with a variety of types of image capture devices, such as designated video cameras and devices employing a video camera, as may be applicable to one or more of electronics manufacturing, life sciences and microscopy, surveillance and security. Accordingly, some embodiments are directed to image capture as described herein, in which an image sensor captures image data with respective exposure times and temporal offsets relative to other pixels as discussed. Other embodiments are directed to processing circuitry that matches and otherwise processes the image data. Such circuitry may, for example, be remote relative to the image capture and implemented to offload processing requirements. Other embodiments are directed to methods and/or apparatuses including both local and remote method or apparatus components.

The various method-based embodiments as discussed herein are implemented with one or more apparatuses, such as may involve image data processing circuits, image capturing circuits and control circuits for reading out captured image data. In one such embodiment, an apparatus includes a plurality of circuit modules that operate to construct video data using image data samples having different exposure times and being temporally offset relative to one another. The modules may, for example, be implemented together on a programmed computer-type circuit.

Accordingly, a first circuit module provides captured temporally-consecutive samples of image data for each of a plurality of pixels representing an imaged scene. In some embodiments, this first circuit module includes a communication circuit that receives such temporally-consecutive samples. In other embodiments, the first circuit module includes an image data processor that operates to read out the temporally-consecutive samples of image data from a digital image sensor (e.g., a pixel array). In yet other embodiments, the first circuit module includes an image sensor that captures digital image data. Further, the first circuit may include two or more of these components. For each pixel, each of the captured samples has an exposure time that is different than the exposure time of other captured samples for the pixel. Each captured sample is also temporally offset relative to the captured samples for at least another one of the pixels.

A second circuit module generates, for each of a plurality of time periods, a synthetic sample for each of the pixels by computing, for each synthetic sample, a combined intensity of the captured samples that fall within the time period for that pixel. A third circuit module groups, for each of a plurality of different time periods, synthetic samples from adjacent ones of the pixels. A fourth circuit module matches, for each of the plurality of pixels, image data in a first one of the groups of synthetic samples with image data in a second one of the groups of synthetic samples, by comparing the groups of synthetic samples obtained for different ones of the plurality of different time periods. A fifth circuit module constructs video frames by combining image data from the respective captured samples based upon the matched image data from the first and second groups of synthetic samples. In some embodiments, one or more of the second through fifth circuit modules are implemented on a device that is common with the first circuit module. In other embodiments, one or more of the second through fifth circuit are implemented separately, such as a remote device via which image data provided via the first circuit module is sent (e.g., with the first circuit module being implemented on a mobile telephone, and the second through fifth circuit modules being implemented at remote server that offloads computationally-intensive processing from the mobile telephone).

The first circuit module provides the captured temporally-consecutive samples in a variety of manners to suit particular embodiments. In some embodiments, the first circuit module captures samples from the respective pixels on a frame-by-frame basis, in which pixels having samples with an exposure time that ends on the particular frame are captured (e.g., while other pixels having exposure times that end on subsequent frames are not captured). This partial-read out scheme can be implemented to avoid pixel-by-pixel shutters. In other embodiments, the first circuit module includes or uses such shutters to control the exposure of each pixel.

Turning now to the figures, FIG. 1 shows a temporally-offset video sampling approach, in accordance with another example embodiment. By way of example, ten pixels are shown as labeled 1-10, with the understanding that various embodiments involve the use of a multitude of such pixels. Each pixel captures temporally-consecutive image samples (e.g., data corresponding to a pixel sensor over an exposure time) using different exposure times, and the time during which each image sample is collected is temporally offset relative to the time during which one or more other image samples are collected by other pixels with an overlapping time.

In particular, each row 1-10 represents the sampling intervals of pixels 1-10, and the width of each rectangular box represents an exposure time for the image data captured corresponding to that box. By way of example, each pixel is shown repeatedly using a sequence of randomly-permuted 4 exposure values, with various embodiments being directed to using other exposure values. Referring to pixel 10, respective image samples are obtained for different exposures as shown in boxes 110, 112, 114 and 116. Respective image samples obtained in different ones of the pixels are also temporally offset as shown, for example, between pixels 9 and 10.

Using this approach, a particular scene may be imaged at respective times using different exposures, which can be beneficial for addressing different types of imaging conditions (e.g., a longer exposure can be useful in low-light conditions, and a shorter exposure can mitigate saturation in bright regions to facilitate a large dynamic range). Resulting aspects such as blur and noise in dark regions can be overcome by combining images collected at different exposures to construct video based upon spatial and temporal redundancy, such as by comparing different regions in search windows 120 and 122. Accordingly, these approaches can facilitate both desirable temporal resolution (in the form of a higher frame rate) and high dynamic range.

The sampling scheme can be implemented on a single imaging chip, via which a subset of pixels having exposure times ending on a particular frame is read out on the particular frame, while pixels that are still exposing are skipped. For example, at frame a as shown on the horizontal axis, pixels 1, 6, and 9 are read out. At frame b (7 frames after frame a), pixels 3 and 7 are read out. Furthermore, by using such an approach, about all light can be collected from a particular scene.

FIG. 2 shows another temporally-offset video sampling approach, in accordance with another example embodiment. For every time period T (e.g., T=1/30 second), all pixels are sampled and read out. Relative to FIG. 1, the image samples obtained as shown in FIG. 2 include respective image samples collected at different exposures and that collectively fall within a common time period. Like FIG. 1, the image samples 210, 212, 214 and 216 have different exposures and are temporally offset, relative to image samples for one or more other pixels. Within the period T, pixels are also sampled using offsets and varying exposure times.

As may be implemented with the approaches shown in FIG. 1 or 2, or in other embodiments in which samples are captured from adjacent pixels that are temporally aligned, a more specific embodiment involves a coded sampling scheme in which each pixel location uses a randomly-selected permutation of exposure times and an offset. Powers of two are used for the set of exposure times to obtain a compression factor of $n:\log_2(n+1)$. The value n is set at n=15 to provide approximately a 4× increase in frame rate and $\{1, 2, 4, 8\}$ frames as the set of exposures (e.g., as respectively shown for samples 210, 214, 216 and 212). The random sequences of exposures can be repeated temporally to obtain longer videos. As there are no gaps between exposures, the sampling scheme achieves 100% light throughput. Furthermore, no gain compensation is performed between the different exposures times, which results in the eight-frame samples being three stops brighter than one-frame samples.

At the end of each frame (e.g., with 210 being a single frame), approximately one fourth of the pixels on the sensor are sampled, as represented by the completion of the exposure (right-most side of each box/sample). In some embodiments, this sampling is implemented using a sensor with a partial read out of the sensor that skips pixels that are still exposing, such as described above with regard to time b in FIG. 1. Such a partial read out may, for example, employ a tiled sampling pattern. In certain embodiments, row and column addressing is employed to activate electronic shutters of the pixels being sampled.

The collected samples (e.g., low-speed coded sampling video) are used to construct high-speed video by exploiting spatial and temporal redundancy. Block matching is used to find similar video patches within frames and/or across frames. Three dimensional space-time patches are used as blocks. Groups of similar patches are identified and their different sampling patterns are used to de-blur longer exposure samples and fill in saturated pixels.

In some embodiments, the reconstruction is done in two stages. The first stage includes block matching on the sampled input data, and optimizing using less accurate matches. In the second stage, intermediate outputs of the first stage are matched to obtain better matches and sharper results. In some implementations, both the first and second stages use the same optimization method once the matches have been obtained. In further implementations, a forward/backward consistency check is implemented to terminate flow trajectories in the video.

In a particular implementation, block matching is carried out in the first stage by searching for the K-nearest space-time patches within a three-dimensional search window around a reference patch. In order to compute a patch distance between two differently-sampled patches, samples captured with shorter exposures (e.g., a source sample) are blurred/combined to match a sample captured with a longer exposure (e.g., a target sample). Referring to FIG. 1 by way of example, such block matching may be carried out using search windows 120 and 122 having a 3×3 array of frames therein.

Figure 3:
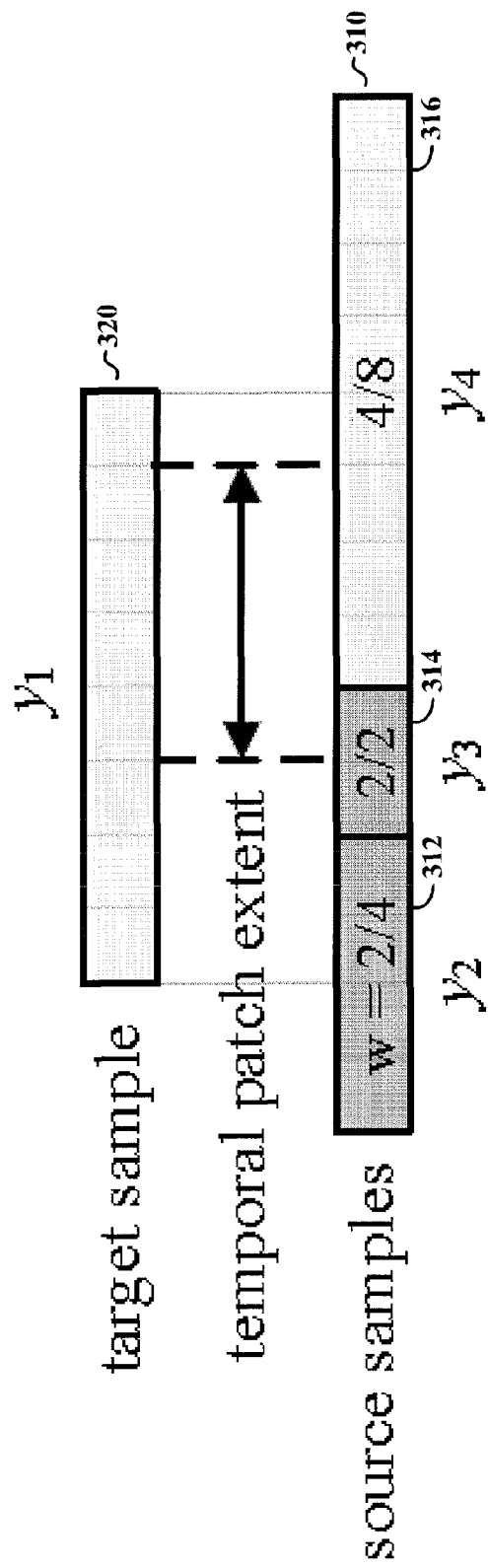
FIG. 3 shows an approach to generating synthetic samples, in accordance with another example embodiment.

FIG. 3 shows an approach to generating and comparing synthetic samples, in accordance with another example embodiment. A source 310 includes samples 312, 314 and 316 as shown, and is blurred by combining weighted intensity values of the samples to obtain a synthetic sample z corresponding to a target 320. More specifically, a value is computed for the synthetic by combining half of sample 312, all of sample 314 and half of sample 316, with its variance being $\sigma^2 = 1/4 + 1 + 1/4$. Using a temporal patch extent of 3 frames as marked by the search windows 120 and 122 in FIG. 1, since the target 320 covers the full 4 frame extent of the patch, the square of the difference value between the target 320 and the synthetic sample z will have a weight of $4/(1+\sigma^2)$ in the total patch distance. For instance, comparing groups of synthetic samples obtained for different time periods in this regard may include comparing an intensity of respective groups of synthetic samples including a first pixel and at least two pixels immediately adjacent the first pixel.

Accordingly, source samples are weighted based on their coverage of the target sample, and a variance for the blurred value is computed assuming each individual sample has the same variance. The squared difference between the target sample and the blurred source value contributes to the patch distance with a weight proportional to the target sample's coverage of the current patch divided by the variance of the residual.

In a second stage, a combination of optical flow and search-based block matching is used on the estimated video from the first stage as consistent with FIG. 3. In some implementations, optical flow is computed over an entire video using a graphics processing unit (GPU) implementation of the TV-L1 optical flow algorithm as described in C. Zach, T. Pock, and H. Bischof, "A Duality Based Approach for Realtime TV-L1 Optical Flow," *DAGM*, 2007, which is fully incorporated herein by reference. The flows are concatenated and refined to obtain trajectories of length up to a temporal radius (e.g., a radius of 5). In some implementations, forward and backward consistency checks are used to terminate trajectories early. Search-based block matching is used to reach a target number of matches (e.g., 20) in addition to the matches from flow: Block matching in this second stage may, for example, use a sum of square distances (SSD) patch distance, as facilitated by the result of the first stage being densely-sampled high-speed video.

Figure 4:
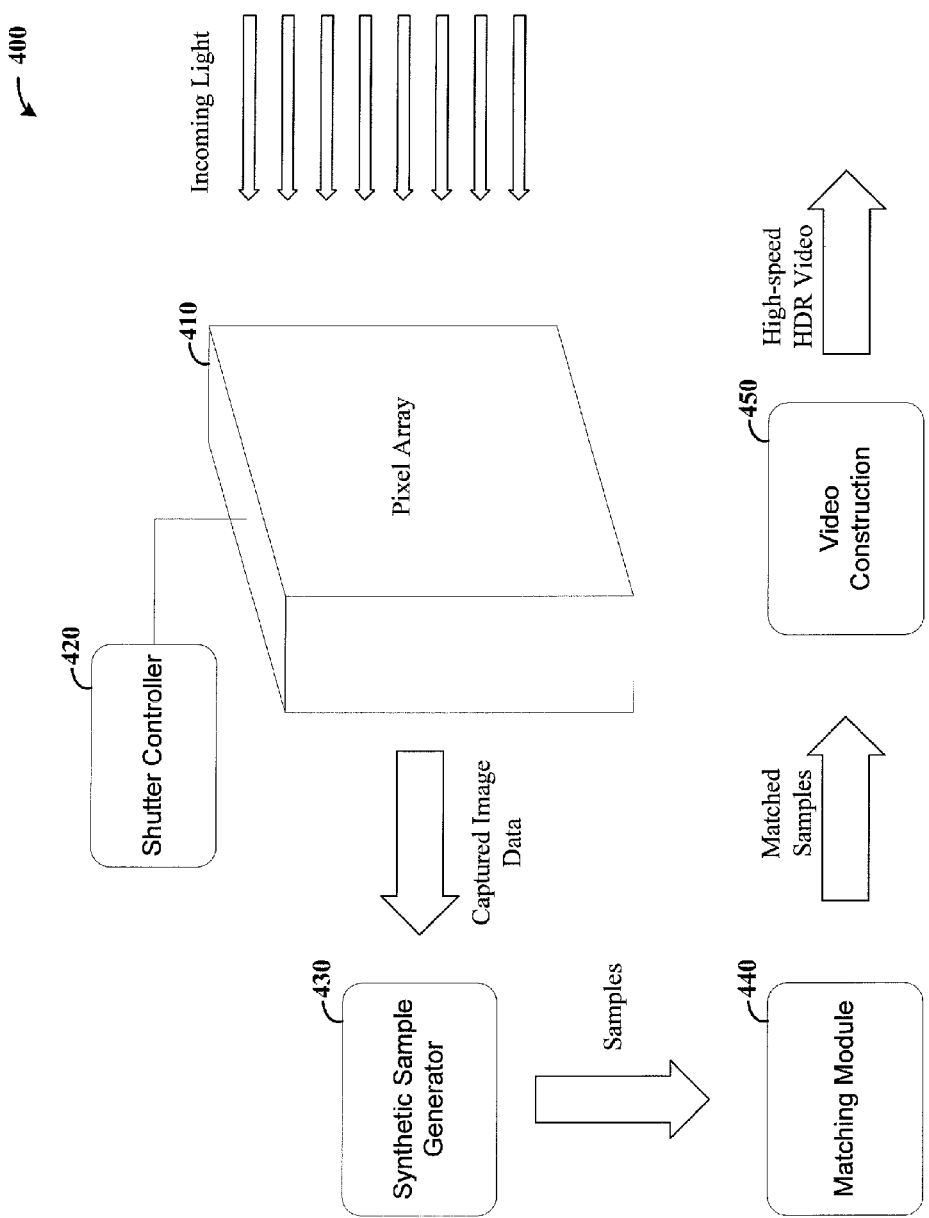
FIG. 4 shows an apparatus for capturing video, in accordance with another example embodiment.

FIG. 4 shows an apparatus 400 for capturing video, in accordance with another example embodiment. The apparatus 400 includes a sensor 410 having a plurality of pixels that respectively capture temporally-consecutive samples of image data. Each captured sample has an exposure time that is different than the exposure time of other captured samples for the pixel, and the captured samples for each of the pixels is temporally offset relative to the captured samples for at least another one of the pixels. The captured image data is provided to a synthetic sample generator 430, which operates to generate synthetic samples by computing, for each synthetic sample, a combined intensity of the captured samples that fall within the time period for that pixel (e.g., blurring source samples, such as described in connection with FIG. 3 above).

In some implementations, the sensor 410 partially reads-out the pixels therein at each frame, based upon those pixels that have been exposed for their respective exposure period (e.g., as described in connection with FIGS. 1 and 2 above). In some implementations, the apparatus 400 includes a shutter controller 420 that controls individual shutters for each pixel, to facilitate the capture of the respective samples at different exposures and temporally-offset relative to one another.

A matching module 440 matches the samples including the synthetic samples, and provides matching data with image data to a video construction module 450 that generates output HDR video by combining image data from the respective captured samples, based upon the matched images from the first and second groups of synthetic samples. Accordingly, for each of several time periods, the matching module 440 groups synthetic samples from adjacent ones of the pixels, and image data in respective groups is matched by comparing synthetic samples obtained for different ones of the time periods and different ones of the pixels. In some implementations, the matching module 440 carries out respective steps as discussed for the first and second stages above, in which functions such as convex optimization and optical flow are carried out.

Figure 5:
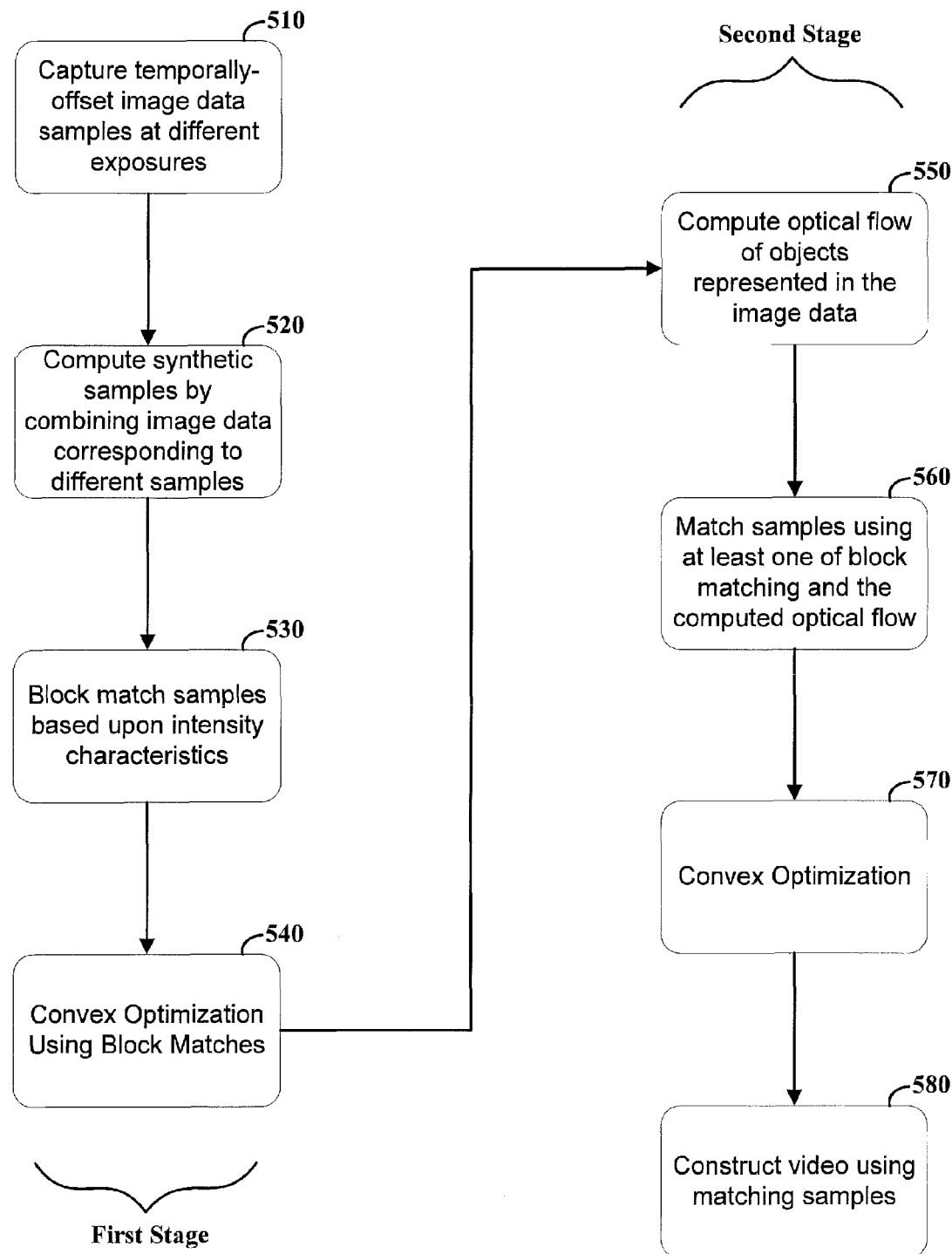
FIG. 5 is a flow diagram showing an approach for generating video, in accordance with another example embodiment.

FIG. 5 is a flow diagram showing an approach for generating video, in accordance with another example embodiment. The approach shown in FIG. 5 may, for example, be implemented with the apparatus 400 shown in FIG. 4. In a first stage and beginning at block 510, temporally-offset image data samples are captured at different exposures. Synthetic samples are computed at block 520 by combining image data corresponding to different samples, and the synthetic samples are block matched at block 530 based upon intensity characteristics. Convex optimization is then performed at block 540, using the block matches.

In a second stage, an optical flow of the reconstructed video data from the first stage is calculated at block 550, such as by using an exhibited flow of objects throughout a scene. At block 560, at least one of the optical flow and a block-matching approach are used to match samples (e.g., block matching is used for samples in which optical flow is unreliable). Convex optimization is again performed at block 570, and video is constructed using the optimized samples at block 580. In some embodiments, the respective stages are repeated for different groups of pixels (e.g., where the groups are randomly compared within a particular time window), with groups not matching being discarded upon a subsequent repetition.

Block matching as shown in FIG. 5 and/or otherwise described herein is carried out using one or more of a variety of approaches. For exemplary purposes, the following notation is used for matching in the context of the ensuing discussion of example embodiments involving block matching: i is the location of a reference patch, $G_i$ is the reference patch's set of matches with $j \in G_i$ being the location of a match, and the patch distance for a given match is $d_{ij}$ (a normalized, mean squared error value).

Figure 6:
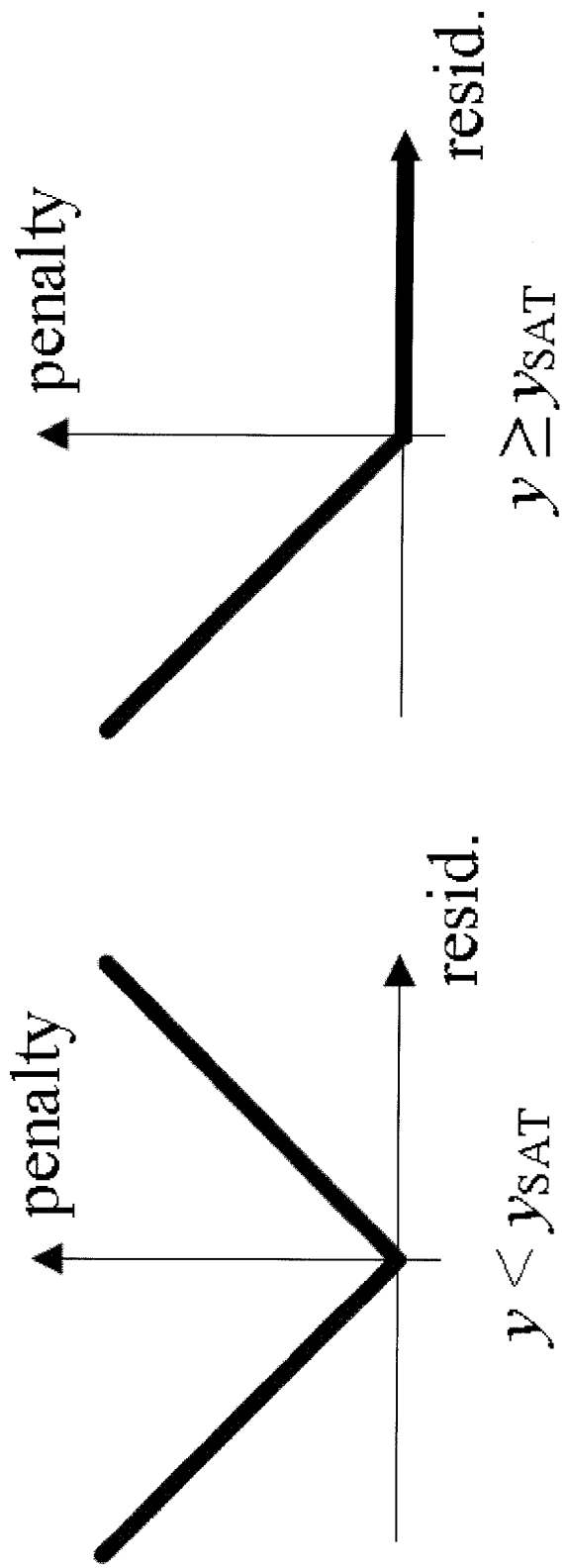
FIG. 6 shows a penalty approach used to process saturation, in accordance with another example embodiment.

An objective function is implemented using matching results for both a data term and a regularization term, and an L1 norm is used for both terms. If the input value is saturated in the data term, a one-sided version of the L1 norm as shown in FIG. 6 is used so that brighter values are not penalized. Residuals in which the estimate is less than the saturated input are penalized. The objective function is then given by:

$$\sum_i \sum_{j \in G_i} w_{ij} \left( \frac{\tau_{max}}{\tau_j} \|S_{i|j} x - y_j\|_{1*} + \gamma \|x_i - x_j\|_1 \right),$$

where $S_{i|j}$ samples the high-speed data x at location i using the sampling pattern at location j; and $y_j$, which is the input at location j, is used to constrain $S_{i|j} x$. The weights $w_{ij}$ are given by $$w_{ij} = \exp\left(-\frac{d_{ij}}{2\sigma^2}\right).$$

The $\tau_{max}/\tau_j$ term is used to give more weight to constraints with shorter exposures to provide sharper results and better reconstruction of saturated regions. The $\tau_j$ term may vary on a per-sample basis rather than a per-patch basis.

The second stage of the reconstruction also assigns a smaller weight to constraints from the search-based block matching, which can improve the sharpness provided by optical flow matching. The weights are reduced by a factor of about 0.5 for search-based block matching constraints, and the objective function is rewritten as $$\|Ax-b\|_{1*} + \gamma \|Fx\|_1,$$

where A is a sparse matrix with the weighted $S_{i|j}$ terms as it rows, b is a column vector of the weighted $y_j$ inputs, and F is a sparse matrix with $w_{ij}(\delta_i - \delta_j)$ as its rows ($\delta_i$ is a row vector with a 1 at location i). In some implementations, such a sparse matrix approach is not used in lieu of using a regularization method that facilitates local updates with aggregation.

The objective function above is minimized using the ADMM algorithm as described in S. Boyd, N. Parikh, E. Chu, B. Peleato, and J. Eckstein, "Distributed Optimization and Statistical Learning via the Alternating Direction Method of Multipliers," *Foundations and Trends in Machine Learning*, 3(1):1-122 (2011) (which is fully incorporated herein by reference), by formulating it as a constrained convex optimization:

$$\text{minimize} \|z_1\|_{1*} + \|z_2\|_1$$
$$\text{subject to} \begin{bmatrix} A \\ \gamma F \end{bmatrix} x - \begin{bmatrix} z_1 \\ z_2 \end{bmatrix} = \begin{bmatrix} b \\ 0 \end{bmatrix}.$$

The primal-dual algorithm for solving this optimization problem is as follows:

```
M := A^τ A + γ²F^τ F
z_1 := u_1 := z_2 := u_2 := 0
for k = 1 to iters do
    d := A^τ(b + z_1 - u_1) + γF^τ(z_2 - u_2)
    x := M^{-1} d
    τ_1 := Ax - b
    τ_2 := γFx
    z_1 := SoftThreshold_1* (τ_1 + u_1, ρ)
    z_2 := SoftThreshold_1(τ_2 + u_2, ρ)
    u_1 := τ_1 + u_1 - z_1
    u_2 := τ_2 + u_2 - z_2
end for
```

The SoftThreshold$_{1*}$ function is a soft thresholding operation modified for the one-sided penalty function as follows:

$$z = SoftThreshold_{1*}(\upsilon, \rho)$$
$$= \begin{cases} \min\left(\upsilon + \frac{1}{\rho}, 0\right), & \upsilon \le 0 \\ \max\left(\upsilon - \frac{1}{\rho}, 0\right), & \upsilon > 0 \text{ and not saturated} \\ \upsilon, & \text{otherwise} \end{cases}$$

where "not saturated" means the corresponding input value from y is less than $y_{SAT}$. The SoftThreshold1 function is the standard soft thresholding operation for the L1 norm. The ρ parameter affects the convergence of the algorithm: larger values result in smaller steps between iterations. In the first stage, ρ=2 is used, and ρ=10 is used in the second stage.

In some implementations, a sparse GPU implementation of the conjugate gradient method is used to solve the x:=M$^{-1}$ d step. The A, A$^T$, F, and F$^T$ operations in the loop are performed without explicitly forming the matrices for memory considerations. The main bottleneck in the algorithm is forming the sparse matrix M, which can be accomplished using the Eigen library's RandomSetter class as described in *Eigen*, "RandomSetter Class Template Reference," December 2012, which is fully incorporated herein by reference.

In some implementations, a full RGB input video is used, with hardware implementation on vertically stacked photodiodes that are used in Foveon X3 sensors available from Foveon of Santa Clara, Calif. In other implementations, a Bayer pattern filter is used to filter video data for matching (e.g., as an input to the data term) in both stages to handle a Bayer pattern input. In still other implementations, a tiled sampling pattern is used in place of random patterns as discussed herein, for row and column addressing.

Various modules or other circuits may be implemented to carry out one or more of the operations and activities described herein and/or shown in the figures. In these contexts, a "module" is a circuit that carries out one or more of these or related operations/activities (e.g., capturing image data, combining image data from respective pixels, computing intensities, generating a synthetic sample, generating output video, or otherwise processing video data). For example, in certain of the above-discussed embodiments, one or more modules are discrete logic circuits or programmable logic circuits configured and arranged for implementing these operations/activities, as in the circuit modules shown in FIG. 4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Various embodiments described above and shown in the figures may be implemented together and/or in other manners. One or more of the items depicted in the drawings/figures herein can also be implemented in a more separated or integrated manner, or removed and/or rendered as inoperable in certain cases, as is useful in accordance with particular applications. For example, different exposure times and temporal offsets may be implemented to suit particular embodiments. As another example, image data capture and video construction aspects can be carried out in a single device, or in different components that are in communication with one another. In view of this and the description herein, those skilled in the art will recognize that many changes may be made thereto without departing from the spirit and scope of the present disclosure.

What is claimed is:
1. A method comprising:
for each of a plurality of pixels representing an imaged scene, providing captured temporally-consecutive samples of image data, each captured sample having an exposure time that is different than an exposure time of other captured samples for the pixel, the captured samples for each of the pixels being temporally offset relative to the captured samples for at least another one of the pixels;

for each of a plurality of time periods, generating a synthetic sample for each of the pixels by computing, for each synthetic sample, a combined intensity of the captured samples that fall within the time period for that pixel;

for each of a plurality of different time periods, grouping synthetic samples from adjacent ones of the pixels;

for each of the plurality of pixels, matching image data in a first one of the groups of synthetic samples with image data in a second one of the groups of synthetic samples by comparing the groups of synthetic samples obtained for different ones of the plurality of different time periods; and constructing video frames by combining image data from the respective captured samples based upon the matched image data from the first and second groups of synthetic samples.

2. The method of claim 1, wherein comparing the groups of synthetic samples obtained for different ones of the plurality of different time periods includes comparing an intensity of a first group of synthetic samples including a first pixel and at least two pixels immediately adjacent the first pixel, with an intensity of a second group of synthetic samples including a second pixel and at least two pixels immediately adjacent the second pixel.

3. The method of claim 1, wherein matching image data from a pixel in a first one of the groups of synthetic samples with image data from a pixel in a second one of the groups of synthetic samples includes tracking optical flow of an object imaged in the pixel in the first one of the groups of synthetic samples to the pixel in the second one of the groups of synthetic samples.

4. The method of claim 1, wherein constructing video frames further includes comparing different sets of the combined image data and determining an optical flow of images in the scene, and combining ones of the different sets of the combined image data based upon the determined optical flow.

5. The method of claim 1, wherein providing the temporally-consecutive samples includes capturing each of the temporally-consecutive samples by randomly selecting an exposure time from a group of predefined exposure times for the temporally-consecutive samples, and capturing the samples using the randomly-selected exposure times.

6. The method of claim 1, wherein providing the temporally-consecutive samples includes capturing each of the temporally-consecutive samples from immediately adjacent pixels that are temporally-aligned.

7. The method of claim 1, wherein providing captured temporally-consecutive samples of image data includes capturing samples by, for each frame, capturing samples having an exposure time that ends on that frame.

8. The method of claim 1, wherein providing captured temporally-consecutive samples of image data includes capturing samples from different pixels having respective exposure times that end on different frames by, for each frame, capturing those samples in respective pixels having an exposure time that ends on that frame while other samples in other pixels that are not captured continue to expose during at least a subsequent frame.

9. The method of claim 1, wherein providing the temporally-consecutive samples includes capturing samples having different exposure times for each pixel, at least two of the temporally-consecutive captured samples for one of the pixels including first and second temporally-consecutive samples, the first sample having an exposure time that ends temporally before an exposure time of the second sample begins.

10. The method of claim 1, wherein providing the temporally-consecutive samples includes capturing samples for different ones of the pixels based upon a random time offset between the captured samples.

11. The method of claim 1, wherein providing the temporally-consecutive samples includes capturing samples, for one of the pixels, using a randomly-selected exposure time for each captured sample.

12. The method of claim 1, wherein providing the temporally-consecutive samples includes capturing the temporally-consecutive by capturing samples for different ones of the pixels based upon a random time offset between the captured samples, and capturing samples, for one of the pixels, using a randomly-selected exposure time for each captured sample.

13. The method of claim 1, wherein providing the temporally-consecutive samples includes capturing the temporally-consecutive by using a separate shutter for each pixel to control the acquisition of image data for a predetermined exposure period.

14. The method of claim 1, further including computing an optical flow of images in the constructed video frames, for each pixel in the constructed video frames, for each of a plurality of different time periods, grouping image data from adjacent ones of the pixels in the constructed video frames, and matching image data in different ones of the groups of image data by comparing the groups of image data obtained for different ones of the plurality of different time periods, and constructing second video frames by combining image data from the respective captured samples based upon at least one of: the optical flow and the matching of image data in said constructed video frames.

15. A method comprising:

capturing temporally-consecutive samples of video image data over time for a plurality of different pixels, using different exposure times for different ones of the respective samples captured by each pixel, the captured samples for each of the pixels being temporally offset relative to the captured samples of other ones of the pixels;

generating synthetic samples from the captured samples by, for each synthetic sample, computing an intensity of the image data captured for a pixel during a particular time period in which at least one of the samples is captured;

for each of a multitude of groups of samples, matching image data in a first group of the samples with image data in a second group of the samples based on an intensity of the respective groups of samples, the first and second groups of the samples being offset in time and having a common length of time, at least one of the groups of samples including at least one of the synthetic samples; and constructing video frames by combining image data from the respective captured samples based upon at least one of the matching and an optical flow of images in the video.

16. An apparatus comprising:

a first circuit module configured and arranged to, for each of a plurality of pixels representing an imaged scene, provide captured temporally-consecutive samples of image data, each captured sample having an exposure time that is different than the exposure time of other captured samples for the pixel, the captured samples for each of the pixels being temporally offset relative to the captured samples for at least another one of the pixels;

a second circuit module configured and arranged to, for each of a plurality of time periods, generate a synthetic sample for each of the pixels by computing, for each synthetic sample, a combined intensity of the captured samples that fall within the time period for that pixel;

a third circuit module configured and arranged to, for each of a plurality of different time periods, group synthetic samples from adjacent ones of the pixels;

a fourth circuit module configured and arranged to, for each of the plurality of pixels, match image data in a first one of the groups of synthetic samples with image data in a second one of the groups of synthetic samples by comparing the groups of synthetic samples obtained for different ones of the plurality of different time periods; and a fifth circuit module configured and arranged to construct video frames by combining image data from the respective captured samples based upon the matched image data from the first and second groups of synthetic samples.

17. The apparatus of claim 16, wherein the first circuit module includes an image sensor circuit configured and arranged to capture the temporally-consecutive samples having the respective exposure times.

18. The apparatus of claim 16, wherein the first circuit module is configured and arranged to provide the captured temporally-consecutive samples by, for each frame, capturing samples having an exposure time that ends on that frame.

19. The apparatus of claim 16, wherein the first circuit module is configured and arranged to provide the captured temporally-consecutive samples by capturing samples from different pixels of an image sensor, the different pixels having an exposure times that end on different frames by, for each frame, capturing samples in respective pixels having an exposure time that ends on that frame while other samples in other pixels that are not captured continue to expose during at least a subsequent frame.

20. The apparatus of claim 16, wherein the fourth circuit is configured and arranged to compare the groups of synthetic samples by comparing an intensity of a first group of synthetic samples including a first pixel and at least two pixels immediately adjacent the first pixel, with an intensity of a second group of synthetic samples including a second pixel and at least two pixels immediately adjacent the second pixel.

* * * * *

UNITED STATES PATENT AND TRADEMARK OFFICE
CERTIFICATE OF CORRECTION

PATENT NO.       : 8,958,649 B2
APPLICATION NO.  : 13/799436
DATED            : February 17, 2015
INVENTOR(S)      : Zhang et al.

It is certified that error appears in the above-identified patent and that said Letters Patent is hereby corrected as shown below:

In the Claims:

Col. 12, line 14, Claim 12: "consecutive" should read --consecutive samples--.

Col. 12, line 22, Claim 13: "consecutive" should read --consecutive samples--.

Col. 14, line 13, Claim 19: remove the word "an".

Col. 14, line 18, Claim 20: "circuit" should read --circuit module--.

Signed and Sealed this
Fourteenth Day of June, 2016

Michelle K. Lee
*Director of the United States Patent and Trademark Office*